United States Patent [19]

Davis

[11] Patent Number: 4,854,144

[45] Date of Patent: Aug. 8, 1989

[54] VEHICLE IMMOBILIZATION DEVICE

[75] Inventor: Phillip Davis, New York, N.Y.

[73] Assignee: Double Helix Enterprises, New York, N.Y.

[21] Appl. No.: 86,385

[22] Filed: Aug. 17, 1987

[51] Int. Cl.$^4$ ............................................. B60R 25/00
[52] U.S. Cl. ........................................................ 70/226
[58] Field of Search ......... 70/225, 226, 232, DIG. 57, 70/237, 14, 19, 18, 259, 260; 188/32

[56] References Cited

U.S. PATENT DOCUMENTS

| | | | |
|---|---|---|---|
| 1,015,422 | 1/1912 | Campbell | 70/260 |
| 1,464,371 | 8/1923 | Sisk | 70/260 |
| 1,570,110 | 1/1926 | Weller | 70/260 |
| 1,648,472 | 11/1927 | Avery, Jr. | 70/260 |
| 1,688,496 | 10/1928 | Holtzman | 70/18 |
| 1,800,943 | 4/1931 | Junkunc | 70/18 |
| 3,695,071 | 10/1972 | West | 70/259 X |
| 3,826,114 | 7/1974 | Emerson | 70/14 |
| 4,649,724 | 3/1987 | Raine | 70/237 X |
| 4,651,849 | 3/1987 | Givati | 70/225 X |
| 4,738,127 | 4/1988 | Johnson | 70/209 |

FOREIGN PATENT DOCUMENTS

| | | | |
|---|---|---|---|
| 581765 | 10/1924 | France | 70/19 |
| 1558956 | 1/1969 | France | 70/18 |
| 1526304 | 9/1978 | United Kingdom | 70/386 |
| 2095191 | 9/1982 | United Kingdom | 70/259 |
| 2110175 | 6/1983 | United Kingdom | 70/226 |
| 2147556 | 5/1985 | United Kingdom | 70/260 |

*Primary Examiner*—Lloyd A. Gall

[57] ABSTRACT

A one piece "Denver Boot" type vehicle immobilization device which may be effectively stored, transported to the site, and very quickly and efficiently applied, having a hub shield which prevents access to a lug nut of the immobilized vehicle's tire and which has an integral locking housing. The device has an adjustable arm which slides in the housing to open and close the device for application and removal, which locks in the immobilizing position, and which is interconnected to two articulating arms which traverse the tire tread and engage the inside of the tire in the immobilizing position.

9 Claims, 3 Drawing Sheets

VEHICLE IMMOBILIZATION DEVICE

BACKGROUND OF THE INVENTION

1. Field of the Invention

This invention relates to a device for locking a vehicle wheel for impounding or otherwise preventing the movement of the vehicle.

2. Description of the Prior Art

Various devices have been used or proposed for immobilizing vehicles from unauthorized movement, beginning with the well known "Denver Boot" of U.S. Pat. No. 2,960,857 to Winter of Denver, Colo. Most of these devices have means to prevent access to the lug nuts of the vehicle wheel so that the device cannot be defeated by removal of the wheel, locks which the authorized person has the key or combination to, and one or more chocks over which it is difficult or impossible to ride the tire. All of the prior devices, however, suffer from one or more of the following disadvantages: they are very heavy, they are clumsy, they take several minutes to apply or remove by the authorized person, they do not fit the wide variety of tire sizes, they are difficult to store, they are hard to transport, and/or they are very difficult to manufacture.

SUMMARY OF THE INVENTION

It is therefore an object of the present invention to provide a vehicle immobilization device which is simple to manufacture, apply, and easy to carry, transport, and store.

Another object is to provide a device for preventing unauthorized operation of a vehicle which can be quickly applied by police or parking officials.

Another object is to provide a vehicle locking device which fits a large number of tire sizes.

These objects and others as will become apparent from the following disclosure are achieved by the present invention which is a one piece, lightweight, vehicle immobilization device which is useful to prevent unauthorized movement of a vehicle comprising:

A. a hub shield member having means for attaching a left articulating arm and a right articulating arm, said hub shield functioning to prevent access to at least one lug nut of a tire of said vehicle, B. locking housing integral with said hub shield, C. locking means in said housing, D. an adjustable arm slidably mounted through said housing, said adjustable arm having lock engaging means which function to prevent sliding of said adjustable arm when said locking means is engaged, E. means for interconnecting said left articulating arm, said right articulating arm, and said adjustable arm so that said articulating arms move away from the axis of said adjustable arm when said adjustable arm is slid through said housing in an outward direction through said housing, allowing said device to be placed on a vehicle tire, and said articulating arms move toward said axis when said adjustable arm is slid in an inward direction through said housing, allowing said device to be adjusted to the circumference of the tire and contact said tire at three points, each of said right, left, and adjustable arms having ends which are adapted to traverse the tread of said tire and engage the inside of said tire so as to prevent removal of said device when it is adjusted to the circumference of said tire and locked.

In another embodiment, the device comprises

A. a hub shield having means for attaching a left arm and a right arm, said hub shield functioning to prevent access to at least one lug nut of a tire of said vehicle, B. locking housing integral with said hub shield, C. locking means in said housing, D. an adjustable arm slidably mounted through said housing permitting adjusting said device to the size of the circumference of said tire, said adjustable arm having lock engaging means which function to prevent sliding of said adjustable arm when said locking means is engaged, E. means for interconnecting said left arm, said right arm, and said adjustable arm, F. each of said right, left, and adjustable arms having ends which are adapted to traverse the tread of said tire and engage the inside of said tire so as to prevent removal of said device when it is adjusted to the circumference of said tire and locked.

DETAILED DESCRIPTION OF THE INVENTION AND THE PREFERRED EMBODIMENT

Figure 1:
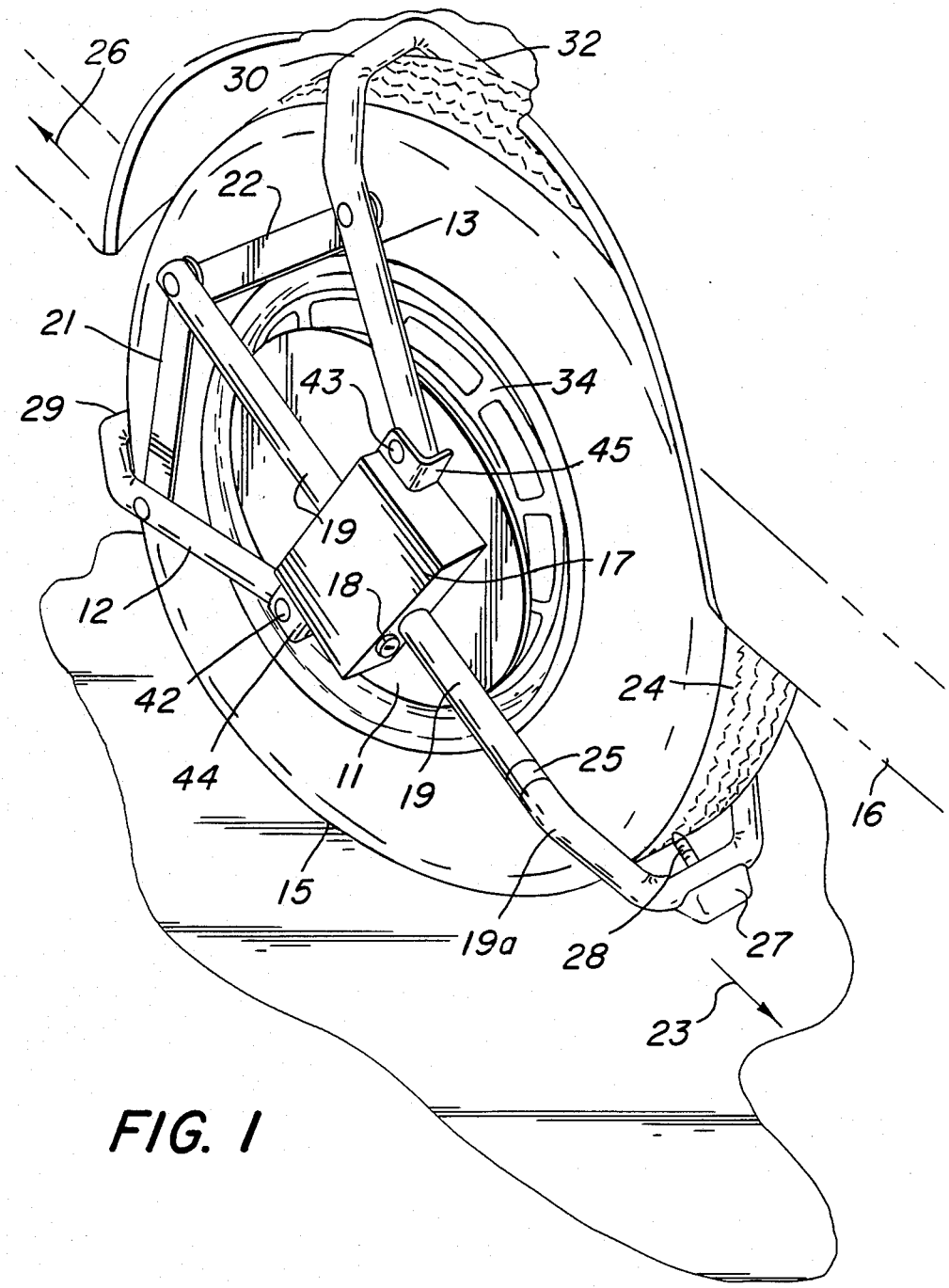
FIG. 1 is a side perspective view of a preferred embodiment of the wheel locking device of the invention, as applied to a wheel of a vehicle.
Figure 2:
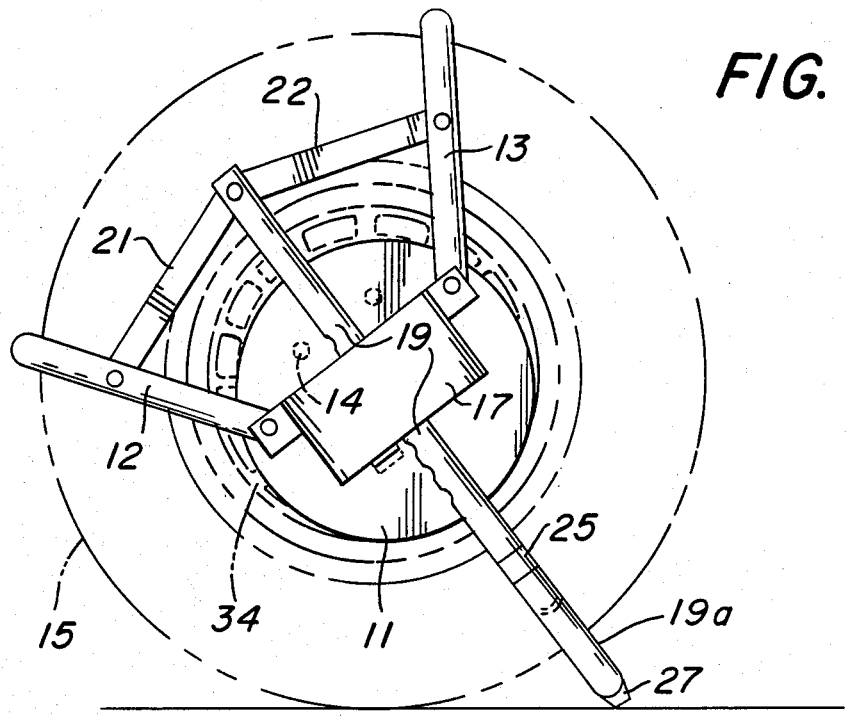
FIG. 2 is a side elevational view of the same embodiment in an open position.
Figure 3:
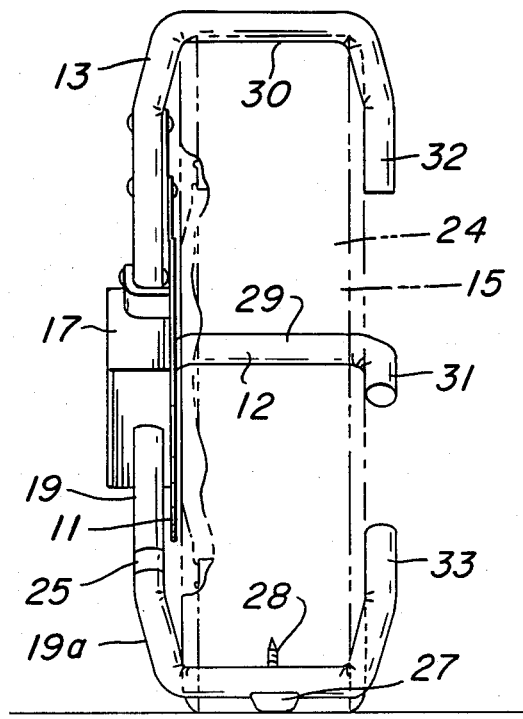
FIG. 3 is a rear elevational view of the device as applied to a tire.
Figure 5:
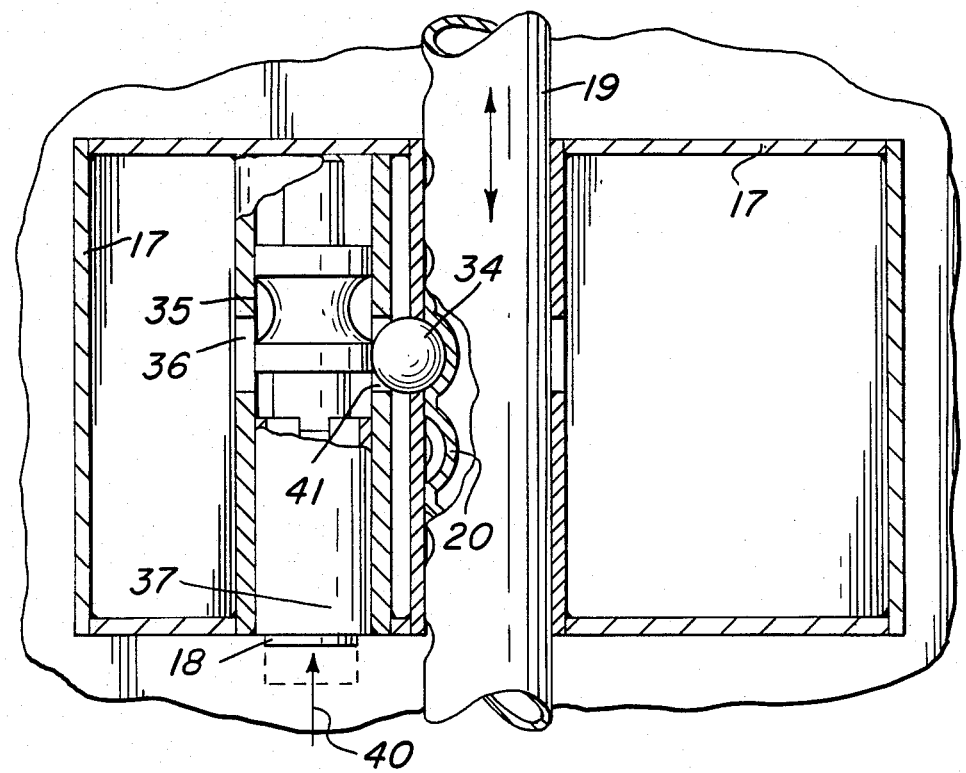
FIG. 5 is a side cross-sectional view of the locking housing taken through 5—5 of FIG. 4, except for the adjustable arm and locking mechanism which are shown in elevation with portions of the locking mechanism and adjustable arm removed for illustration.

Referring to the drawings, it is seen that the preferred embodiment comprises a hub shield member 11 having flanges 44 and 45, and pins 42 and 43, respectively, for attaching a left articulating arm 12 and a right articulating arm 13, said hub shield 11 functioning to prevent access to at least one lug nut 14 (shown in phantom in FIG. 2) behind hub shield 11 and hub cap 34 of a tire 15 of a vehicle 16, locking housing 17 integral with said hub shield 11, locking means 18 (shown in detail in FIG. 5) in said housing 17, an adjustable arm 19 slidably mounted through said housing 17, said adjustable arm 19 having lock engaging means (indents in the preferred embodiment) 20 which function to prevent sliding of said adjustable arm 19 when said locking means 18 is engaged, left interconnecting arm 21 for interconnecting said left articulating arm 12 to said adjustable arm 19, and right interconnecting arm 22 which connects the right articulating arm 13 with the adjustable arm 19 so that said articulating arms 12 and 13 move away from the axis of said adjustable arm 19 when said adjustable arm 19 is slid in one direction 23, allowing said device to be placed on a vehicle tire 15, and said articulating arms 12 and 13 move toward said axis when said adjustable arm 19 is slid in the opposite direction 26, allowing said device to be adjusted to the size of the tire 15 and contact said tire 15 at three points, each of said arms 12 and 13 having ends 29 and 30, respectively, which are adapted to traverse the tread 24 of said tire 15 and reverse 31 and 32, respectively (FIG. 3) on the opposing or inside of said tire 15 so as to prevent removal of said device when it is adjusted to the size of said tire 15 and locked by means of said locking means 18 in said housing 17. The device is locked in the engaged position by depressing lock cylinder 37 in direction 40 (FIG. 5) in housing shaft 35 which causes ball bearing 34 to be pushed out of well section 36 through opening 41 in housing shaft 35 into one of the indents 20 in adjustable arm 19, preventing arm 19 from sliding.

Figure 4:
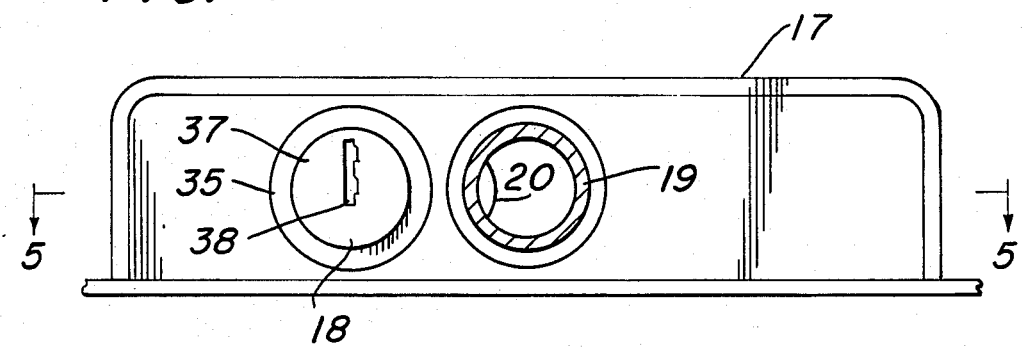
FIG. 4 is a cross-sectional view of the hub, showing the position of a preferred embodiment of the lock and the adjustable arm.

An authorized person who has a key may insert it in key slot 38 (FIG. 4), disengaging lock cylinder 37 so that it moves in opposite direction to 40, i.e., in an outward direction, which allows ball 34 to be released from indent 20 and allows arm 19 to slide in direction 23, which allows articulating arms 12 and 13 to move away from the axis of the articulating arm 19 and the device to be removed, and then the articulating arm may be moved in direction 26, forcing articulating arms 12 and 13 all the way toward the axis of adjustable arm 19 so the device may be carried and stored in its closed position.

Optional collar 25 allows rotation of section 19a of adjustable arm 19 so the device 24 may be applied more easily, i.e., first the device is opened all the way, then ends 29 and 30 are put over the tread 24 of the tire 15 then section 19a is turned across the tread of the tire, adjustable arm 19 is pushed in direction 26 to close the device on the tire 15, and the lock 18 is engaged by pushing it in direction 40, immobilizing the vehicle from any further movement until an authorized person disengages the lock.

A spike 28 on section 19a is fixed in a position to puncture tire 15 is an unauthorized person tries to drive the vehicle when the device is engaged. Chock 27 provides additional interference with driving the vehicle when the device is engaged by increasing the distance over which the tire must ride.

In a less complicated and less preferred embodiment, the articulating arms are actually fixed in a permanent position, i.e., they are not actually able to articulate, and only the adjustable arm is moveable. In this embodiment, there are no interconnecting arms 21 and 22, but the so-called articulating arms 12 and 13 can be connected directly to each other by a single member (not shown).

I claim:

1. A one piece, light weight, vehicle immobilization device useful to prevent theft of a vehicle, or to prevent driving of said vehicle by its owner, comprising
   A. a hub shield member having means for attaching a left arm and a right arm, said hub shield functioning to prevent access to at least one lug nut of a tire of said vehicle,
   B. locking housing integral with said hub shield,
   C. locking means in said housing,
   D. an adjustable arm slidably mounted through said housing permitting adjusting said device to the size of the circumference of said tire, said adjustable arm having lock engaging means which function to prevent sliding of said adjustable arm when said locking means is engaged,
   E. means for interconnecting said left arm, said right arm, and said adjustable arm for simultaneous movement of said left and right arms when said adjustable arm is slid through said housing,
   F. each of said right, left, and adjustable arms having ends which are adapted to traverse the tread of said tire and engage the inside of said tire so as to prevent removal of said device when it is adjusted to the circumference of said tire and locked.

2. A one piece, light weight, vehicle immobilization device useful to prevent theft of a vehicle, or to prevent driving of said vehicle by its owner, comprising
   A. a hub shield member having means for attaching a left articulating arm and a right articulating arm, said hub shield functioning to prevent access to at least one lug nut of a tire of said vehicle,
   B. locking housing integral with said hub shield,
   C. locking means in said housing,
   D. an adjustable arm slidably mounted through said housing, said adjustable arm having lock engaging means which function to prevent sliding of said adjustable arm when said locking means is engaged,
   E. means for interconnecting said left articulating arm, said right articulating arm, and said adjustable arm so that said left and right articulating arms move away from the axis of said adjustable arm when said adjustable arm is slid through said housing in an outward direction, allowing said device to be placed on a vehicle tire, and said articulating arms move toward said axis when said articulating arm is slid in an inward direction through said housing, allowing said device to be adjusted to the circumference of the tire and contact said tire at three points, each of said right, left, and adjustable arms having ends which are adapted to traverse the tread of said tire and engage the inside of said tire so as to prevent removal of said device when it is adjusted to the circumference of said tire and locked.

3. Device of claim 2 having a spike mounted on the tread traversing section of at least one of said arms.

4. Device of claim 2 wherein said adjustable arm has a section which is adapted to rotate to facilitate quick application of the device.

5. Device of claim 2 wherein said interconnecting means are a left linking arm connected to said left articulating arm and said adjustable arm, and a right linking arm connected to said right articulating arm and said adjustable arm.

6. Device of claim 2 wherein said locking means comprises a ball and well configuration, and said lock engaging means are indentations on said adjustable arm.

7. Device of claim 2 wherein said right articulating arm and said left articulating arm are each attached to said hub shield by means of a flange and pin through said flange, the arm, and the hub shield.

8. Device of claim 1 having a chock mounted on the outside of at least one arm, and functioning to deter attempts to drive said vehicle.

9. Device of claim 2 wherein said locking means is engaged by depression without use of a key, and a key is needed to disengage said locking means.

* * * * *